US010439373B2

(12) United States Patent
Shindo et al.

(10) Patent No.: US 10,439,373 B2
(45) Date of Patent: Oct. 8, 2019

(54) DC POWER SUPPLY DISTRIBUTION BOARD

(71) Applicant: MITSUBISHI ELECTRIC CORPORATION, Tokyo (JP)

(72) Inventors: Hisanori Shindo, Tokyo (JP); Toshifumi Ogai, Tokyo (JP); Yutaro Omichi, Tokyo (JP); Masato Ohara, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/073,231

(22) PCT Filed: Apr. 22, 2016

(86) PCT No.: PCT/JP2016/062731
§ 371 (c)(1),
(2) Date: Jul. 26, 2018

(87) PCT Pub. No.: WO2017/183175
PCT Pub. Date: Oct. 26, 2017

(65) Prior Publication Data
US 2019/0044311 A1 Feb. 7, 2019

(51) Int. Cl.
*H02B 1/056* (2006.01)
*H02B 1/04* (2006.01)
(Continued)

(52) U.S. Cl.
CPC ............... *H02B 1/40* (2013.01); *H02B 1/041* (2013.01); *H02B 1/056* (2013.01); *H02J 1/08* (2013.01); *H02B 1/21* (2013.01); *H02B 1/42* (2013.01)

(58) Field of Classification Search
CPC ................................ H02B 1/041; H02B 1/056
See application file for complete search history.

(56) References Cited

U.S. PATENT DOCUMENTS 3,142,002 A * 7/1964 Hammerly ........... H01R 13/642 361/635
5,322,982 A * 6/1994 Leger ....................... H01H 5/06 200/306
(Continued)

FOREIGN PATENT DOCUMENTS

JP S-60-128806 A 7/1985
JP S-63-029310 U 2/1988
(Continued)

OTHER PUBLICATIONS

International Search Report (PCT/ISA/210) dated Jul. 26, 2016, by the Japan Patent Office as the International Searching Authority for International Application No. PCT/JP2016/062731.

*Primary Examiner* — Robert J Hoffberg
(74) *Attorney, Agent, or Firm* — Buchanan Ingersoll & Rooney PC

(57) ABSTRACT

There is adopted a shape in which the portions, at the central side of a distribution board, of left and right unit bases on which respective breakers are mounted can be arranged in a staggered manner, so that there is realized a structure in which units can be horizontally arranged while the units share a central vertical bus-line. Alternatively, two insertion-type breakers are horizontally arranged on one and the same unit base and wiring is performed from a contactor provided on the unit base to the primary-side terminal of each of the breakers, so that the left and right breakers share the central vertical bus-line.

2 Claims, 5 Drawing Sheets

9
10
9
7
11
12
8
12
11

(51) Int. Cl.

| | |
|---|---|
| ***H02B 1/40*** | (2006.01) |
| ***H02J 1/08*** | (2006.01) |
| *H02B 1/21* | (2006.01) |
| *H02B 1/42* | (2006.01) |

(56) References Cited

U.S. PATENT DOCUMENTS

| | | | | |
|---|---|---|---|---|
| 5,978,209 | A * | 11/1999 | Montague | H02B 1/056 200/294 |
| 6,472,605 | B1 * | 10/2002 | Griffith | H02B 1/056 174/101 |
| 8,482,905 | B2 * | 7/2013 | Mooney | H01H 9/26 361/634 |
| 2016/0056616 | A1 | 2/2016 | Sangawa | |

FOREIGN PATENT DOCUMENTS

| | | | |
|---|---|---|---|
| JP | H-07-011742 | U | 2/1995 |
| JP | 2004-282802 | A | 10/2004 |
| JP | 2009-178030 | A | 8/2009 |
| JP | 2012-065465 | A | 3/2012 |
| WO | WO 2015/029474 | A1 | 3/2015 |

* cited by examiner

DC POWER SUPPLY DISTRIBUTION BOARD

TECHNICAL FIELD

The present invention relates to a DC power supply distribution board and particularly to a DC power supply distribution board having an improved case structure that makes it possible to reduce the number of components and the assembly man-hours.

BACKGROUND ART

In a conventional distribution board, for example, as disclosed in Japanese Utility Model Laid-Open S63-29310 (Patent Document 1), a three-phase four-wire distribution board having four vertical bus-lines is known.

In general, as a DC power supply distribution board, the structure illustrated in FIGS. 5A and 5B is known. That is to say, two units on which two respective breakers 2*a* and 2*b* arranged in the left and right sides are mounted are horizontally disposed; for the two respective units, two pieces each of vertical bus-lines 3 and 4, i.e., totally four vertical bus-lines are provided so that the two units can individually be inserted or removed. The vertical bus-lines 3 and 4, four in number are arranged in a limited space inside the distribution board; in order to secure an insulation distance between the vertical bus-lines 3 and 4, flat conductors are adopted.

The left and right breakers 2*a* and 2*b* are provided with protection covers 1*a* and 1*b*, respectively; the vertical bus-lines include the vertical bus-lines 3 for the left unit and the vertical bus-lines 4 for the right unit. The vertical bus-line 3 for the left unit is connected with a left-side contactor 5, and the vertical bus-line 4 for the right unit is connected with a right-side contactor 6. The left-side contactor 5 that is included in the left unit and is connected with the vertical bus-line 3 is mounted on a left unit base 7; the right-side contactor 6 that is included in the left unit and is connected with the vertical bus-line 4 is mounted on a right unit base 8.

[Patent Document 1] Japanese Utility Model Laid-Open S63-29310 (FIGS. 1 and 2)

DISCLOSURE OF THE INVENTION

Problems to be Solved by the Invention

Because in the conventional DC power supply distribution board, the two units on which the respective breakers are mounted are horizontally arranged, two vertical bus-lines are provided in each of the left and right units; thus, four vertical bus-lines are required. Accordingly, a space in the transverse direction is required; thus, there has been a problem that the DC power supply distribution board increases in size.

Meanwhile, a conventional control center utilizes a structure in which three Z-shaped vertical bus-lines are arranged so that a three-phase alternating current is supplied to each of the loads; however, with regard to the foregoing DC power supply distribution board having a structure in which four vertical bus-lines are provided, the insulation distance is not sufficient; therefore, this particular structure cannot be adopted and hence it is required to secure a dedicated design/assembly line.

The objective of the present invention is to obtain a DC power supply distribution board that makes it possible to adopt a three-vertical-bus-line structure so that the space for the vertical bus-lines is reduced and hence downsizing can be achieved, to unify the components, to reduce the assembly man-hours, and to decrease the number of components so that the material cost is reduced, in order to solve the problem that it is required to secure the dedicated design/assembly line, while the independence of each of the left and right breakers is maintained.

Means for Solving the Problems

In a DC power supply distribution board according to the present invention in which two breakers mounted on respective unit bases are arranged side by side, a central vertical bus-line for the N-phase or P-phase of a DC circuit is shared by the two breakers; vertical bus-lines including the central vertical bus-line are configured with three vertical bus-lines; three respective contactors corresponding to the three vertical bus-lines are provided.

Advantage of the Invention

In the present invention, the vertical bus-line for the N-phase or the P-phase of the DC circuit is shared by the left and right breakers, so that a three-vertical-bus-line structure can be utilized; therefore, it is made possible to obtain a DC power supply distribution board that reduces the space for the vertical bus-lines and can be downsized. Moreover, it is made possible to realize unification of the components and reduction of the assembly man-hours; furthermore, the material cost can be reduced by decreasing the number of components.

Objectives, features, aspects, and advantages other than those, described above, of the present invention will became more apparent from the following detailed description of the present invention when taken in conjunction with the accompanying drawings.

BEST MODE FOR CARRYING OUT THE INVENTION

Hereinafter, preferred embodiments of a DC power supply distribution board according to the present invention will be explained with reference to the drawings.

Embodiment 1

Figure 1A:
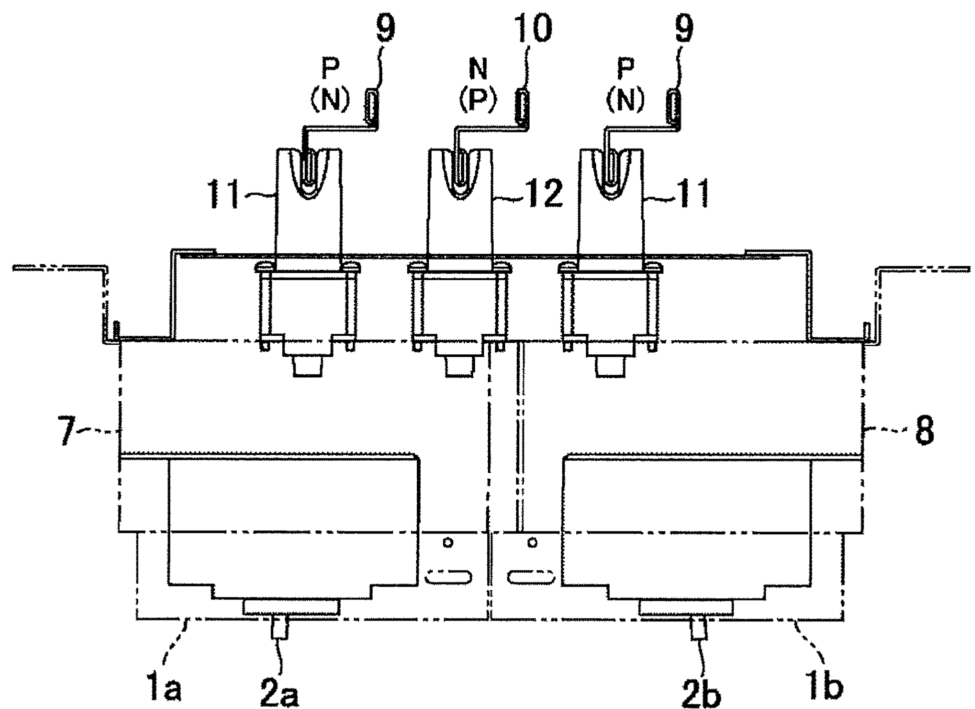
FIG. 1A is a plan view illustrating a state where units of a distribution board according to Embodiment 1 of the present invention are mounted.
Figure 1B:
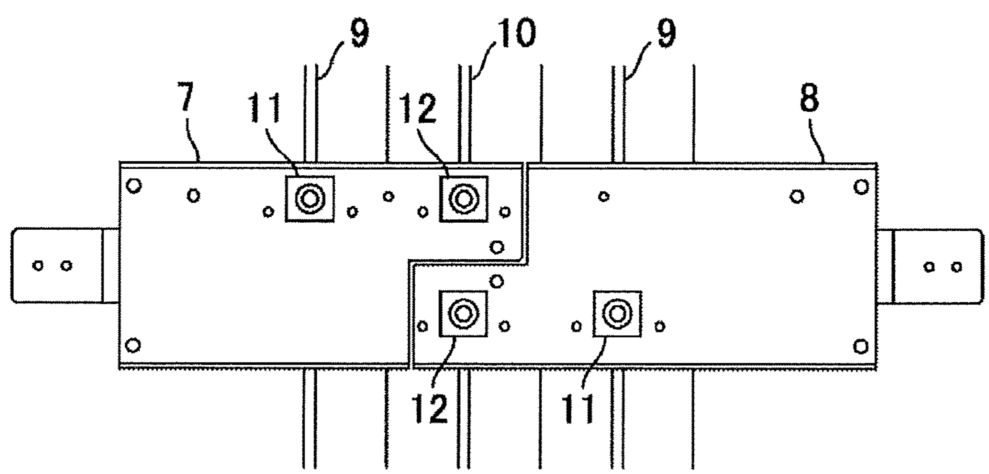
FIG. 1B is a front view illustrating a state where breakers have been removed from FIG. 1A.
Figure 2:
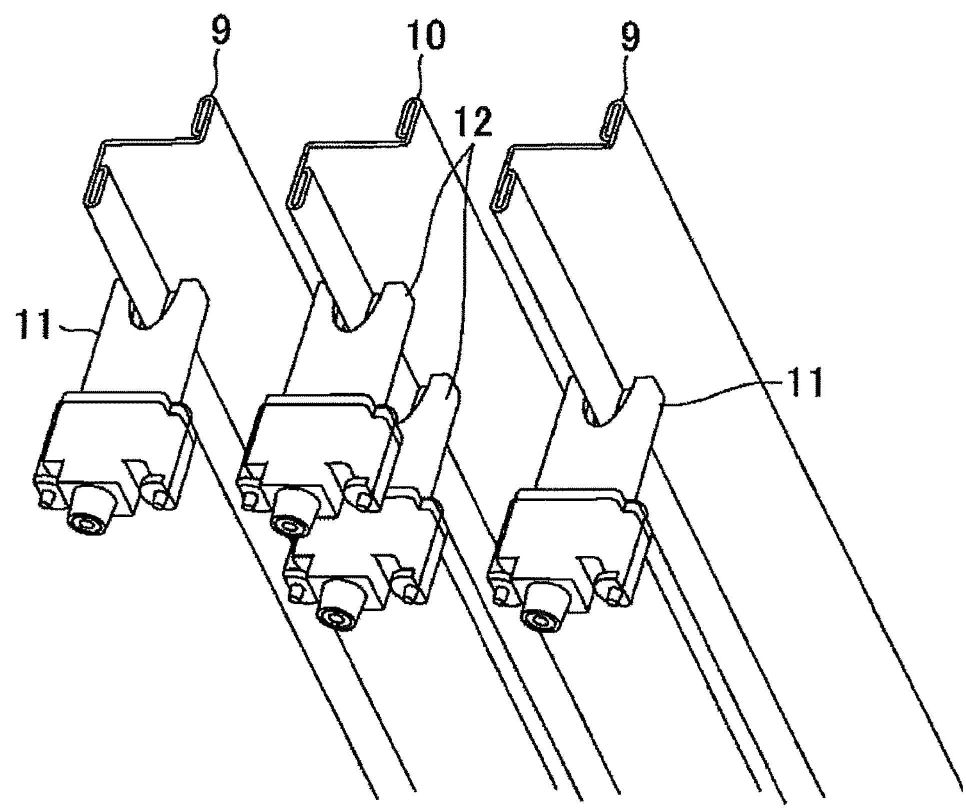
FIG. 2 is a perspective view illustrating a state where units of the distribution board according to Embodiment 1 of the present invention are mounted.

FIG. 1A is a plan view illustrating a state where units are mounted in a DC power supply distribution board according to Embodiment 1 of the present invention; FIG. 1B is a front view illustrating a state where breakers have been removed from FIG. 1A. FIG. 2 is a perspective view illustrating only necessary members in order to comprehend the positions where contactors 12 bite a central vertical bus-line 10.

Figure 5A:
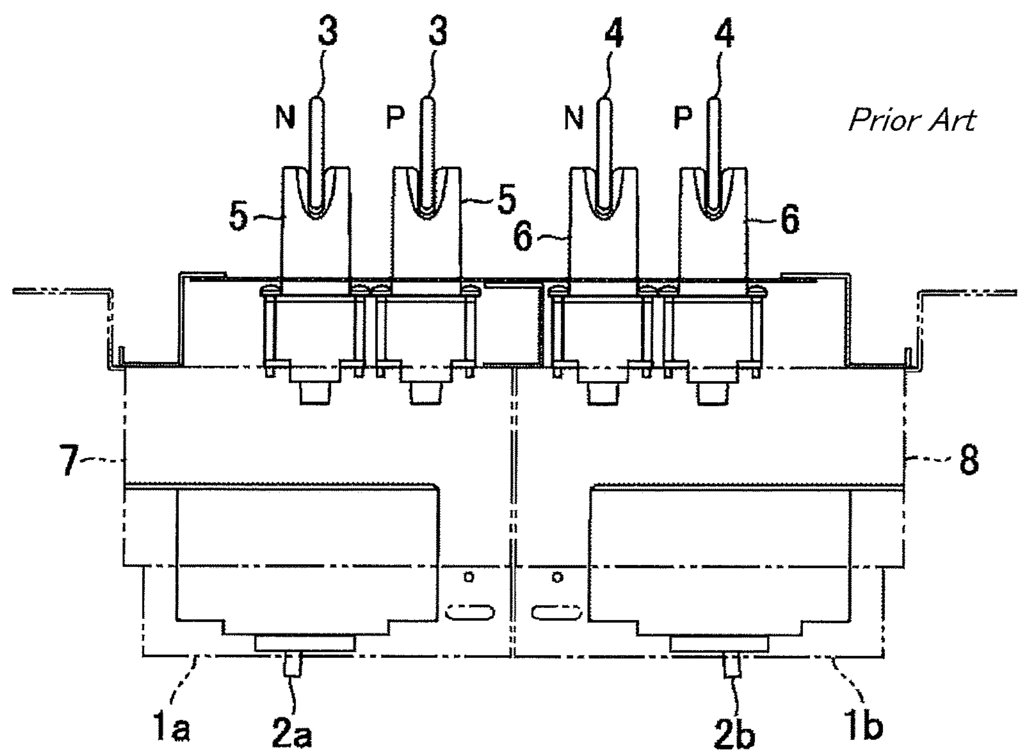
FIG. 5A is a plan view illustrating a state where units of an ordinary four-bus-line-structure DC power supply distribution board are mounted.
Figure 5B:
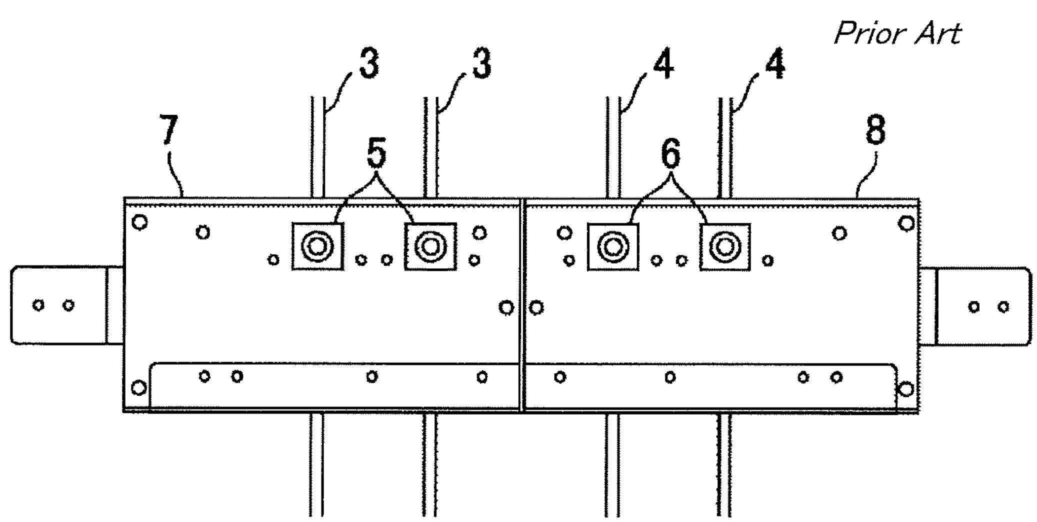
FIG. 5B is a front view illustrating a state where breakers have been removed from FIG. 5A.

In an ordinary DC power supply distribution board, two pieces each of vertical bus-lines 3 and 4 for left and right units, respectively, i.e., totally four vertical bus-lines are provided, as illustrated in FIGS. 5A and 5B; however, in a DC power supply distribution board according to Embodiment 1 has a structure in which as illustrated in FIGS. 1A, 1B, and 2, three-vertical-bus-line structure is utilized, in which the vertical bus-line 10 for the N-phase (or the P-phase) of a DC circuit is disposed at the center, and in which the vertical bus-line 10 disposed at the center is flanked with remaining vertical bus-lines 9 for the P-phase (or the N-phase). A structure in which the left and right breaker-mounted units share the vertical bus-line 10 disposed at the center makes it possible to utilize the three-vertical-bus-line structure.

In FIG. 1A, the left and right breakers 2*a* and 2*b* have protection covers 1*a* and 1*b*, respectively; as can be seen in FIG. 1B, the respective contactors 12 to be connected with the central vertical bus-line 10 are provided in a left unit base 7 and a right unit base 8, respective parts of which are cut away and that are disposed in such a way that the narrowed end portions thereof are arranged in a staggered manner in the vertical direction. Respective contactors 11 to be connected with the left and right vertical bus-lines 9 are provided in the left unit base 7 and the right unit base 8. In this explanation, the unit base denotes a member that functions as a base for fixing respective members in the unit thereto.

The front view in FIG. 1B is a drawing in which in order to comprehend the respective shapes of the left unit base 7 and the right unit base 8, only the necessary members are illustrated by removing the breakers 2*a* and 2*b*. As illustrated in FIG. 1B, the left unit base 7 has a shape in which the lower-right portion thereof is cut away, when viewed from the front; the right unit base 8 has a shape in which the upper-left portion thereof is cut away, when viewed from the front. In other words, there is adopted a shape in which the respective portions, at the central side of the distribution board, of the left unit base 7 and the right unit base 8 are arranged in a staggered manner. This shape makes it possible to arrange the central portions of the units in a staggered manner. Then, as described above, the contactors 12 to be connected with the central vertical bus-line 10 are arranged side by side in the vertical direction at the respective portions that are narrowed through cutting of the end portions.

The contactor 12 that bites the N-phase (or P-phase) vertical bus-line 10 is provided in each of the left unit base 7 and the right unit base 8 that are arranged in a staggered manner. In the case of the left unit base 7, the contactor 11 that bites the P-phase (or N-phase) vertical bus-line 9 is provided at the left side of the contactor 12, when viewed from the front; in the case of the right unit base 8, the contactor 11 that bites the P-phase (or N-phase) vertical bus-line 9 is provided at the right side of the contactor 12, when viewed from the front. This structure makes it possible that the respective biting positions, on the vertical bus-line 10 disposed at the center, of the left and right units can be shifted in the vertical direction; thus, the units can horizontally be arranged within the same unit height.

The perspective view in FIG. 2 is a drawing illustrating only necessary members in order to comprehend the positions where the contactors 12 bite the central vertical bus-line 10. As described above, the contactor 12 to be connected with the central vertical bus-line 10 is provided in each of the left unit base 7 and the right unit base 8, at the respective portions of the unit bases that are arranged in a staggered manner; thus, it is made possible that while the left and right units are arranged in the horizontal direction, the central vertical bus-line 10 is shared by the left and right units.

As described above, the DC power supply distribution board according to Embodiment 1 has a structure in which in a DC power supply distribution board having a structure in which the left and right breakers 2*a* and 2*b* mounted in the unit bases 7 and 8, respectively, are horizontally arranged, the central vertical bus-line 10 for the N-phase (or P-phase) of the DC circuit is shared by the left and right breakers 2*a* and 2*b* mounted in the unit bases 7 and 8, respectively; thus, a three-vertical-bus-line structure is adopted. The vertical bus-lines including the central vertical bus-line 10 and the respective vertical bus-lines 9 disposed at the both sides of the central vertical bus-line 10 are configured with three vertical bus-lines, and the vertical bus-line 10 for the N-phase (or P-phase) of the DC circuit is shared by the left and right breakers 2*a* and 2*b*; thus, the space for the vertical bus-lines is reduced and hence a downsizable DC power supply distribution board can be obtained.

Because the vertical-bus-line structure that is adopted in the control center can be utilized, it is made possible to realize unification of the components and reduction of the assembly man-hours; furthermore, the material cost can be reduced by decreasing the number of components.

In the DC power supply distribution board according to Embodiment 1, the unit having the unit base 7 on which the breaker 2*a* is mounted and the unit having the unit base 8 on which the breaker 2*b* is mounted are provided; there is adopted a structure in which the respective portions, at the central side of the distribution board, of the left and right unit bases 7 and 8 are arranged in a staggered manner in such a way as to extend on a vertical plane; the contactors 12 to be connected with the central vertical bus-line 10 are arranged at the staggered portions so that the foregoing left and right units are horizontally arranged, while sharing the central vertical bus-line 10. As a result, the vertical bus-line for the N-phase (or the P-phase) of the DC circuit is shared by the left and right breakers, so that a three-vertical-bus-line structure can be utilized; therefore, it is made possible to obtain a DC power supply distribution board that reduces the space for the vertical bus-lines and can be downsized.

Because the vertical-bus-line structure that is adopted in the control center can be utilized, it is made possible to realize unification of the components and reduction of the assembly man-hours; furthermore, the material cost can be reduced by decreasing the number of components; moreover, the contactors 12 that lead to the breakers 2*a* and 2*b* and are to be connected with the central vertical bus-line 10 are arranged at the respective staggered portions of the unit bases 7 and 8, and the left unit base 7 and the right unit base 8 are complementarily combined, so that downsizing can be achieved.

Furthermore, the DC power supply distribution board according to Embodiment 1 is provided with the unit having the unit base 7 on which the breaker 2*a* is mounted and the unit having the unit base 8 on which the breaker 2*b* is mounted; with regard to the respective end portions, at the center, of the foregoing left and right units, the end portion of one of the foregoing left and right units has a shape in which the lower half thereof is cut away, and the end portion of the other one of the foregoing left and right units has a shape in which the upper half thereof is cut away; the both end portions abut on each other so that the forgoing left and right units are horizontally arranged. As a result, the vertical bus-line for the N-phase (or the P-phase) of the DC circuit is shared by the left and right breakers, so that a three-vertical-bus-line structure can be utilized; therefore, it is made possible to obtain a DC power supply distribution board that reduces the space for the vertical bus-lines and can be downsized.

Because the vertical-bus-line structure that is adopted in the control center can be utilized, it is made possible to realize unification of the components and reduction of the assembly man-hours; furthermore, the material cost can be reduced by decreasing the number of components. Moreover, because the left and right units that each have a shape in which the upper half or the lower half of the end portion is cut away abut on each other so as to be complementarily combined, downsizing can be achieved.

Embodiment 2

Figure 3A:
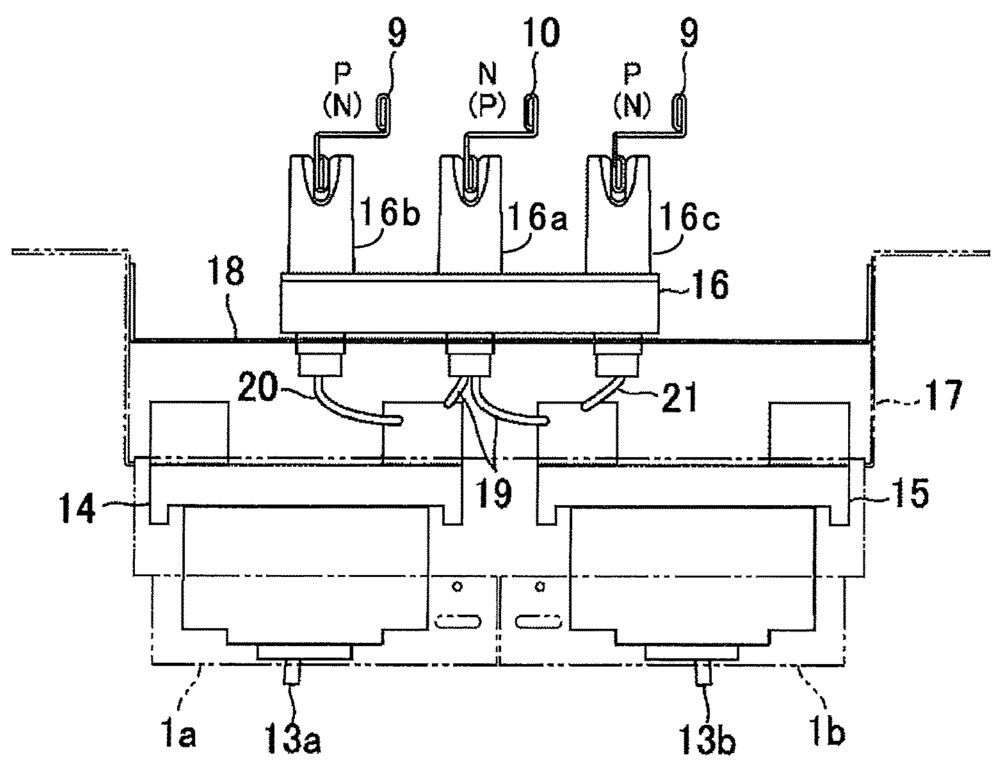
FIG. 3A is a plan view illustrating a state where units of a distribution board according to Embodiment 2 of the present invention are mounted.
Figure 3B:
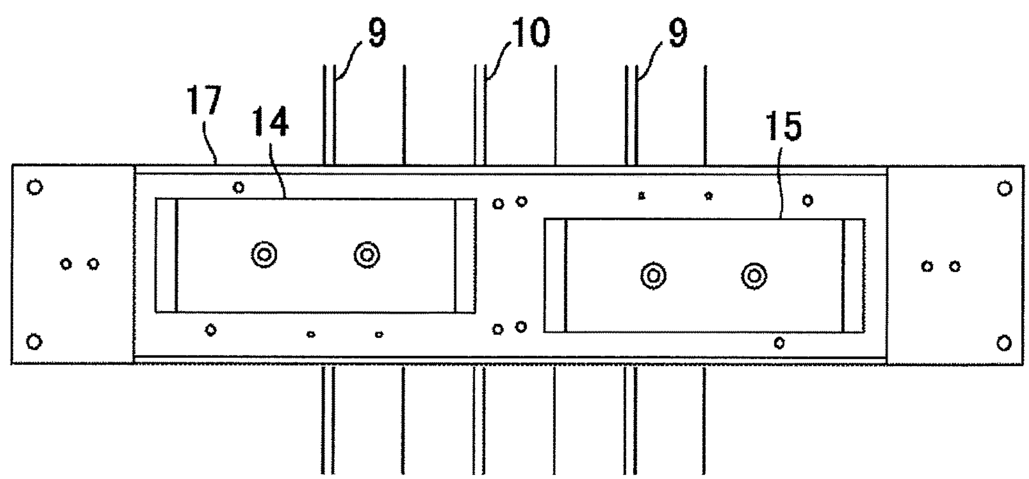
FIG. 3B is a front view illustrating a state where breakers have been removed from FIG. 3A.
Figure 4A:
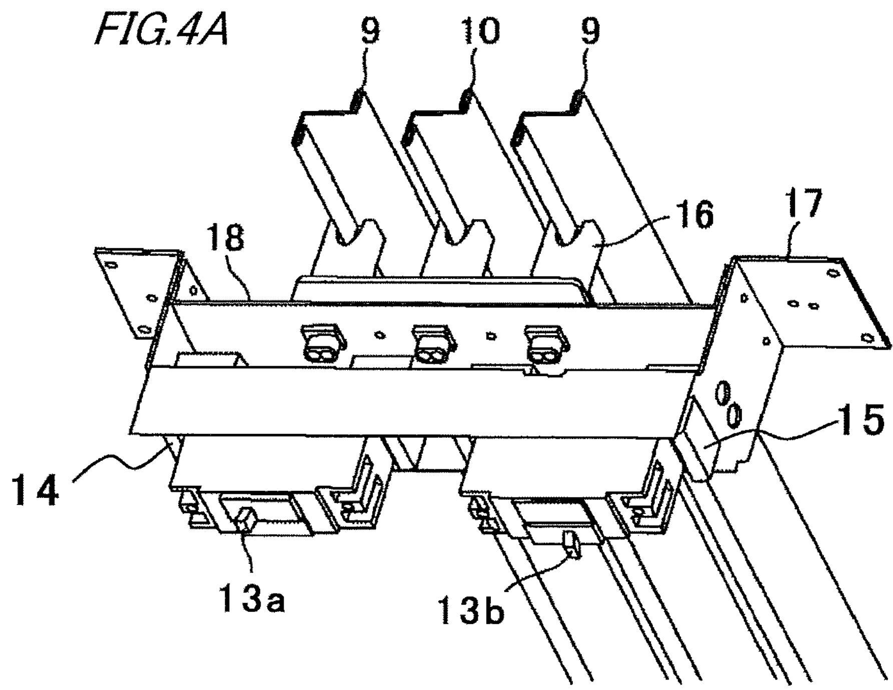
FIG. 4A is a perspective view illustrating a state where units of the distribution board according to Embodiment 2 of the present invention are mounted and the breakers are inserted into respective terminal platforms.
Figure 4B:
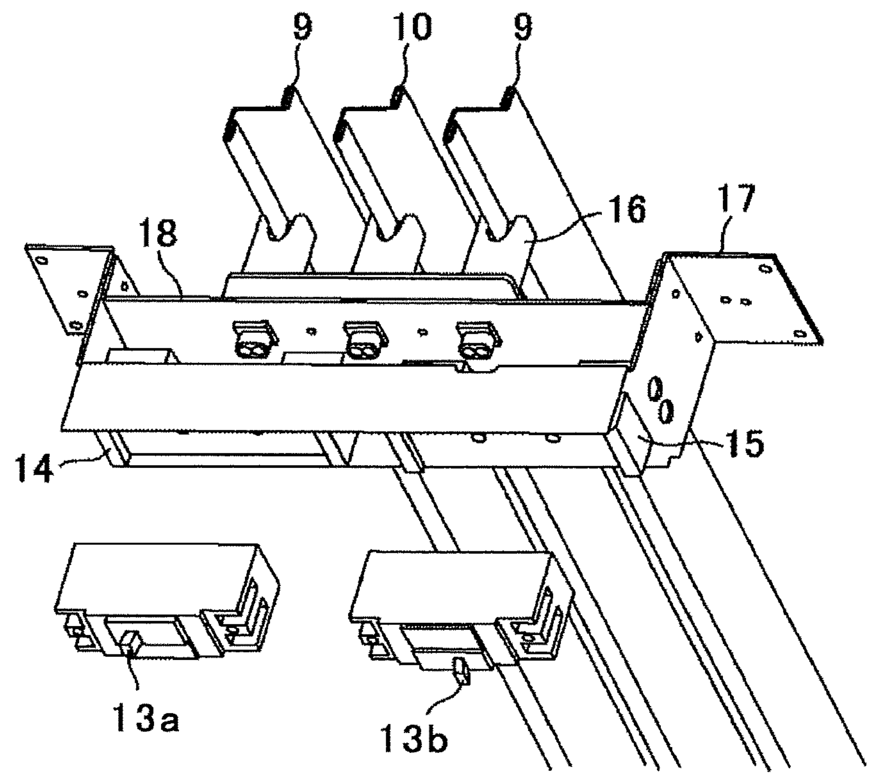
FIG. 4B is a perspective view illustrating a state where the breakers in FIG. 4A have been removed from the respective terminal platforms.

Next, a DC power supply distribution board according to Embodiment 2 of the present invention will be explained based on FIGS. 3A, 3B, 4A, and 4B. FIG. 3A is a plan view illustrating a state where units of a distribution board according to Embodiment 2 are mounted; FIG. 3B is a front view illustrating a state where breakers have been removed from FIG. 3A. FIG. 4A is a perspective view illustrating a state where units of the distribution board are mounted and the breakers are inserted into respective terminal platforms; FIG. 4B is a perspective view illustrating a state where the breakers in FIG. 4A have been removed from the respective terminal platforms.

In Embodiment 2, two insertion-type breakers 13*a* and 13*b* are mounted at the left and right sides of a shared unit base 17 for fixing the left and right breakers, so that a three-vertical-bus-line structure can be utilized, while the independence in insertion or removal of the breakers is maintained.

In FIGS. 3A and 3B, for the sake of connection of the insertion-type breakers 13*a* and 13*b*, insertion terminal platforms 14 and 15 are provided at the left side and the right side, respectively, of the unit base 17, when viewed from the front. Wiring of cables 19 for the N-phase (or the P-phase) of the DC circuit is performed from the middle-phase contacting portion of a contactor 16 mounted on a contactor fixing plate 18, i.e., from the contact portion of the contactor 16 to be connected with the central vertical bus-line 10 to the respective primary-side terminals of the insertion terminal platforms 14 and 15. With regard to the remaining P-phase (N-phase), wiring of a cable 20 is performed from the left-side phase (left-phase contacting portion) of the contactor 16 to the primary-side terminal of the left-side insertion terminal platform 14; wiring of a cable 21 is performed from the right-side phase (right-phase contacting portion) of the contactor 16 to the primary-side terminal of the right-side insertion terminal platform 15. This structure makes it possible to secure the independence in insertion and removal of the breakers 13*a* and 13*b* with a three-vertical-bus-line configuration.

The perspective view in FIG. 4A is a drawing illustrating a state where the insertion-type breaker 13*a* is connected with the left-side insertion terminal platform 14 and the insertion-type breaker 13*b* is connected with the right-side insertion terminal platform 15. The perspective view in FIG. 4B is a drawing illustrating a state where the insertion-type breaker 13*a* has been removed from the left-side insertion terminal platform 14 and the insertion-type breaker 13*b* has been removed from the right-side insertion terminal platform 15. As described above, adoption of an insertion-type breaker makes it possible to insert or remove the insertion-type breakers 13*a* and 13*b* without disconnecting the primary-side cables 19, 20, and 21.

In Embodiment 2, in the DC power supply distribution board having a structure in which the left and right insertion-type breakers 13*a* and 13*b* mounted in the one and the same unit base 17 are horizontally arranged in series with each other, the central vertical bus-line 10 for the N-phase (or P-phase) of the DC circuit is shared by the left and right insertion-type breakers 13*a* and 13*b* mounted on the unit base 17; the vertical bus-lines including the central vertical bus-line 10 and the respective vertical bus-lines 9 disposed at the both sides of the central vertical bus-line 10 are configured with three vertical bus-lines; the unit base 17 is shared by the left and right insertion-type breakers 13*a* and 13*b*, and the left and right insertion-type breakers 13*a* and 13*b* are horizontally arranged in series with each other in the shared unit base 17. Then, the cable 19 connects a middle-phase contacting portion 16*a* of the contactor 16, which is provided on the unit base 17 and has the middle-phase contacting portion 16*a* to be connected with the central vertical bus-line 10, a left-phase contacting portion 16*b* to be connected with the left-side P-phase (or N-phase) vertical bus-line 9, and a right-phase contacting portion 16*c* to be connected with the right-side P-phase (or N-phase) vertical bus-line 9, with each one of the two primary-side terminals provided in each of the insertion-type breakers 13*a* and 13*b*; the cable 20 connects the left-phase contacting portion 16*b* with the other one of the two primary-side terminals provided in the insertion-type breaker 13*a*; the cable 21 connects the right-phase contacting portion 16*c* with the other one of the two primary-side terminals provided in the insertion-type breaker 13*b*; as a result, the left and right insertion-type breakers 13*a* and 13*b* share the central vertical bus-line 10; thus, it is made possible to obtain a DC power supply distribution board that has a three-vertical-bus-line structure, that reduces the space for the vertical bus-lines, and that can be downsized.

Because the vertical-bus-line structure that is adopted in the control center can be utilized, it is made possible to realize unification of the components and reduction of the assembly man-hours; furthermore, the material cost can be reduced by decreasing the number of components. Moreover, the three-vertical-bus-line configuration makes it possible to secure the independence in insertion and removal of the insertion-type breakers 13*a* and 13*b*.

In Embodiment 2, the insertion terminal platform 14 to be connected with the insertion-type breaker 13*a* and the insertion terminal platform 15 to be connected with the insertion-type breaker 13*b* are horizontally arranged in series with each other in the shared unit base 17; wiring of cables 19 for the N-phase (or the P-phase) of the DC circuit is performed from the middle-phase contacting portion 16*a* of the contactor 16, which is provided on unit base 17 and is connected with the central vertical bus-line 10, to each one of the two primary-side terminals provided in each of the insertion terminal platforms 14 and 15, so that the middle-phase contacting portion 16*a* is connected with each one of the primary-side terminals of each of the insertion-type breaker 13*a* and 13*b*. With regard to the remaining P-phase (N-phase), wiring of the cable 20 is performed from the left-phase contacting portion 16*b* of the contactor 16 to the other one of the primary-side terminals of the insertion terminal platform 14 so that left-phase contacting portion 16*b* is connected with the other one of the primary-side terminals of the insertion-type breaker 13*a*, and wiring of the cable 21 is performed from the right-phase contacting portion 16*c* of the contactor 16 to the other one of the primary-side terminals of the insertion terminal platform 15 so that right-phase contacting portion 16*c* is connected with the other one of the primary-side terminals of the insertion-type breaker 13*b*; as a result, the insertion-type breakers 13*a* and 13*b* share the central vertical bus-line 10; thus, it is made possible to obtain a DC power supply distribution board that can have a three-vertical-bus-line structure, that can reduce the space for the vertical bus-lines, and that can be downsized.

Because the vertical-bus-line structure that is adopted in the control center can be utilized, it is made possible to realize unification of the components and reduction of the assembly man-hours; furthermore, the material cost can be reduced by decreasing the number of components; moreover, the three-vertical-bus-line configuration makes it possible to secure the independence in insertion and removal of the insertion-type breakers 13*a* and 13*b*.

In the scope of the present invention, part of or all of the embodiments thereof can freely be combined with one another and can appropriately be modified or omitted.

The invention claimed is:

1. A DC power supply distribution board wherein two breakers mounted on respective unit bases are arranged side by side, wherein a central vertical bus-line for an N-phase or a P-phase of a DC circuit is shared by the two breakers, and vertical bus-lines including the central vertical bus-line are configured with three of the vertical bus-lines, wherein there are included two units provided with the respective unit bases on each of which a respective breaker of the two breakers is mounted, and wherein there is adopted a shape in which staggered portions, at a central side of the DC power supply distribution board, of the respective unit bases of the two units are arranged in a staggered manner; contactors of the two units to be connected with the central vertical bus-line are arranged at the staggered portions so that the two units share the central vertical bus-line and the two units are arranged side by side.

2. The DC power supply distribution board according to claim 1, wherein with regard to end portions at a center of the two units, a respective one of the end portions of one of the two units has a shape in which a lower half thereof is cut away, and another respective one of the end portions of another one of the two units has a shape in which an upper half thereof is cut away; the one end portion and the another end portion abut on each other.

* * * * *